(12) United States Patent  
Kaiser et al.

(10) Patent No.: US 7,979,989 B2  
(45) Date of Patent: Jul. 19, 2011

(54) HANDHELD POWER TOOL

(75) Inventors: Hans Kaiser, Leuzigen (CH); Stefano Delfini, Bettlach (CH)

(73) Assignee: Robert Bosch GmbH, Stuttgart (DE)

( * ) Notice: Subject to any disclaimer, the term of this patent is extended or adjusted under 35 U.S.C. 154(b) by 329 days.

(21) Appl. No.: 12/095,858

(22) PCT Filed: Aug. 1, 2007

(86) PCT No.: PCT/EP2007/057942  
§ 371 (c)(1), (2), (4) Date: Jun. 2, 2008

(87) PCT Pub. No.: WO2008/028728  
PCT Pub. Date: Mar. 13, 2008

(65) Prior Publication Data  
US 2009/0013536 A1     Jan. 15, 2009

(30) Foreign Application Priority Data  
Sep. 4, 2006 (DE) .......................... 10 2006 041 397

(51) Int. Cl.  
*B25F 3/00*      (2006.01)  
*B27B 19/00*     (2006.01)

(52) U.S. Cl. ...................................................... 30/123.3

(58) Field of Classification Search ................ 30/123.3, 30/123.4, 388–394; 125/13.01  
See application file for complete search history.

(56) References Cited

U.S. PATENT DOCUMENTS

| | | | | |
|---|---|---|---|---|
| 1,958,912 A * | 5/1934 | Clark | ............................ | 30/123.3 |
| 2,294,497 A * | 9/1942 | Zawistowski | ................ | 30/123.3 |
| 2,810,954 A * | 10/1957 | Clark | ............................ | 30/123.3 |
| 2,869,231 A * | 1/1959 | Gury, Jr. | ...................... | 30/123.3 |
| 3,085,603 A * | 4/1963 | Stanley | ............................ | 30/392 |
| 3,126,889 A * | 3/1964 | Blumenfeld | ................. | 30/123.3 |
| 3,863,342 A * | 2/1975 | Griffies et al. | ................. | 30/393 |
| 3,896,783 A * | 7/1975 | Manning | ................... | 125/13.01 |
| 3,942,251 A * | 3/1976 | Griffies et al. | ................. | 30/394 |
| 4,188,934 A * | 2/1980 | Reinhardt et al. | ............. | 30/373 |
| 4,240,204 A * | 12/1980 | Walton et al. | .................. | 30/393 |
| 4,272,889 A * | 6/1981 | Scott et al. | ....................... | 30/382 |
| 4,484,417 A * | 11/1984 | Klingerman | ................ | 30/123.3 |
| 4,550,501 A * | 11/1985 | Moores et al. | ................. | 30/393 |
| 4,782,591 A * | 11/1988 | DeVito et al. | ................ | 30/123.3 |
| 4,783,907 A * | 11/1988 | Ravaux | ........................ | 30/123.3 |
| H571 H * | 2/1989 | Hollinger et al. | ........... | 30/123.3 |
| 4,807,361 A | 2/1989 | Raczkowski | | |
| 4,870,946 A * | 10/1989 | Long et al. | ................. | 125/13.01 |
| 4,893,407 A * | 1/1990 | Lane | ............................ | 30/123.4 |
| 4,953,295 A * | 9/1990 | Barradas et al. | ............... | 30/380 |
| 4,962,588 A * | 10/1990 | Fushiya et al. | ................. | 30/393 |
| 5,087,261 A * | 2/1992 | Ryd et al. | ..................... | 30/123.3 |
| 5,088,197 A * | 2/1992 | Anderson | ................... | 30/123.4 |
| 5,161,308 A * | 11/1992 | Hayward | .................... | 30/123.3 |
| 5,178,232 A * | 1/1993 | Bennett et al. | ............... | 30/123.3 |
| 5,188,188 A * | 2/1993 | Mars | .............................. | 30/394 |

(Continued)

FOREIGN PATENT DOCUMENTS  
DE    10 2004 034 814     3/2006

(Continued)

*Primary Examiner* — Jason Daniel Prone  
(74) *Attorney, Agent, or Firm* — Michael J. Striker

(57) ABSTRACT

A handheld power tool includes a housing (12) and a foot plate (14) for guidance on a surface of a workpiece. A pump unit (16), preferably located in the foot plate (14), drives a coolant and/or lubricant flow (18) for cooling and/or lubricating at least one heavy-duty component (20).

19 Claims, 1 Drawing Sheet

U.S. PATENT DOCUMENTS

| | | | |
|---|---|---|---|
| 5,199,174 A * | 4/1993 | Wild | 30/123.3 |
| 5,450,925 A * | 9/1995 | Smith et al. | 30/393 |
| 5,557,853 A * | 9/1996 | Andre et al. | 30/123.3 |
| 5,813,122 A * | 9/1998 | Mubareka | 30/123.3 |
| 6,450,869 B1 * | 9/2002 | Sherez | 451/449 |
| 6,490,795 B1 * | 12/2002 | Krahn | 30/123.4 |
| 6,912,788 B2 * | 7/2005 | Tam et al. | 30/124 |
| 6,925,917 B2 * | 8/2005 | Tilley et al. | 30/123.3 |
| 7,047,647 B1 * | 5/2006 | Muller et al. | 30/392 |
| 7,197,826 B2 * | 4/2007 | Baxivanelis et al. | 30/392 |
| 2008/0282557 A1 * | 11/2008 | Kaiser et al. | 30/392 |
| 2009/0000128 A1 * | 1/2009 | Kaiser et al. | 30/166.3 |
| 2009/0100682 A1 * | 4/2009 | Delfini et al. | 30/124 |

FOREIGN PATENT DOCUMENTS

| | | | |
|---|---|---|---|
| DE | 102006029634 A1 * | 1/2008 | |
| DE | 102006041397 A1 * | 3/2008 | |
| DE | 102006041398 A1 * | 3/2008 | |
| DE | 102006061623 A1 * | 7/2008 | |
| EP | 579964 A1 * | 1/1994 | |
| GB | 2462366 A * | 2/2010 | |
| JP | 58143914 A * | 8/1983 | |
| JP | 06155155 A * | 6/1994 | |
| WO | 2006/008214 | 1/2006 | |
| WO | WO 2006008214 A1 * | 1/2006 | |
| WO | WO 2008000544 A1 * | 1/2008 | |

* cited by examiner

HANDHELD POWER TOOL

BACKGROUND OF THE INVENTION

The invention relates to a handheld power tool.

From German Patent Disclosure DE 10 2004 034 814 A1, a handheld power tool is known that has a housing, a foot plate for guidance on a surface of a workpiece, and a pump unit for driving a cooling and/or lubricant flow for cooling and/or lubricating at least one heavy-duty component. The pump unit is located outside the handheld power tool, or in other words outside its housing and its foot plate, and an air flow that carries the coolant and/or lubricant flow is delivered to the handheld power tool via a hose.

SUMMARY OF THE INVENTION

The invention is based on a handheld power tool having a housing, a foot plate for guidance on a surface of a workpiece, and having a pump unit for driving a coolant and/or lubricant flow for cooling and/or lubricating at least one heavy-duty component. The term "heavy-duty component" should be understood in particular to mean the tool insert and/or a bearing unit and/or guide unit, particularly for a tool of the handheld power tool.

It is proposed that the pump unit is located in the foot plate. As a result, an external pump unit and a hose for delivering the flow of lubricant from the pump unit to the handheld power tool can be dispensed with. The lubrication and cooling of the handheld power tool or tool insert and be designed to be less vulnerable to defects, and thus the mean service life of the lubricated and cooled elements of the handheld power tool can be lengthened.

The invention is usable especially advantageously in the field of handheld power saws, such as jigsaws, back saws, or saber saws. In principle, however, it could be used in other equipment, such as power drills or sanders.

The independence of the pump unit from the load or the operating state of the handheld power tool can be assured by means of a motor, separate from the pump unit, for driving a tool insert, and in alternative exemplary embodiments of the invention, there can also be a driving connection between the motor and the pump unit.

If the pump unit and the motor have a common power supply, then the operation of the pump unit can be synchronized especially easily with the operation of the motor.

By the cooling and/or lubrication according to the invention, the service life of the handheld power tool can be lengthened, especially whenever the heavy-duty component is embodied as a saw blade guide unit for guiding a tool insert embodied as a saw blade.

By the cooling and/or lubrication according to the invention, the service life of the tool insert of the handheld power tool can be lengthened.

Economical cooling and/or lubrication can be attained especially with a pump unit that is intended for generating an air flow. The term "intended" should be understood in this context also to mean "designed" and "equipped". In principle, however, the use of the invention in connection with water cooling, for instance, would also be conceivable.

If the handheld power tool includes a means for admixing lubricant droplets with the air flow, advantageous minimal-quantity lubrication and simultaneous cooling by the air flow can be attained.

The means is structurally simple to implement, and a small droplet size of the lubricant can be assured, if the means includes a Venturi nozzle as its essential element.

Minimal-quantity lubrication that with the least possible consumption of lubricant makes it possible to lengthen the service life of the loaded components significantly can be attained in particular in that the Venturi nozzle is dimensioned such that less than one gram of a lubricant per hour of operation is admixed with the air flow.

By means of a lubricant container located inside the foot plate, the material comprising the foot plate itself can in particular be selected regardless of the chemical nature of the lubricant. The foot plate can accordingly be embodied as an inexpensive diecast component, for instance. The lubricant may for instance include a lubricant material that contains grease and oil, or it can include graphite, or the like. The separate lubricant container can furthermore be replaceable, or it can be removable for refilling.

If the handheld power tool includes a refill opening for refilling the lubricant container with lubricant, then removal of the lubricant container for refilling with lubricant can be dispensed with.

Replacement of an empty lubricant container with a full lubricant container is easily attainable if the lubricant container is detachably connected to the foot plate, in particular manually or without tools.

The replacement can be done especially easily if the lubricant container is embodied as a replaceable lubricant cartridge. The lubricant cartridge can be characterized in particular by a closure opening that opens automatically when the lubricant cartridge is inserted into a suitable opening in the foot plate.

If the handheld power tool includes an adjusting element for adjusting at least one parameter of the coolant and/or lubricant flow, this parameter can be selected as a function of the field in which the handheld power tool is currently being used, for instance as a function of the material to be machined. Especially advantageously, the adjusting element can be equipped with symbols that represent the material to be machined.

The adjustable parameter is advantageously selected such that the adjusting element is intended for adjusting a quantity of lubricant that is carried in the coolant and/or lubricant flow.

Further advantages will become apparent from the ensuing description of the drawings. In the drawings, exemplary embodiments of the invention are shown. The drawings, the description, and the claims include numerous characteristics in combination. One skilled in the art will also consider the characteristics individually and put them together to make further useful combinations.

DETAILED DESCRIPTION OF THE PREFERRED EMBODIMENTS

Figure 1:
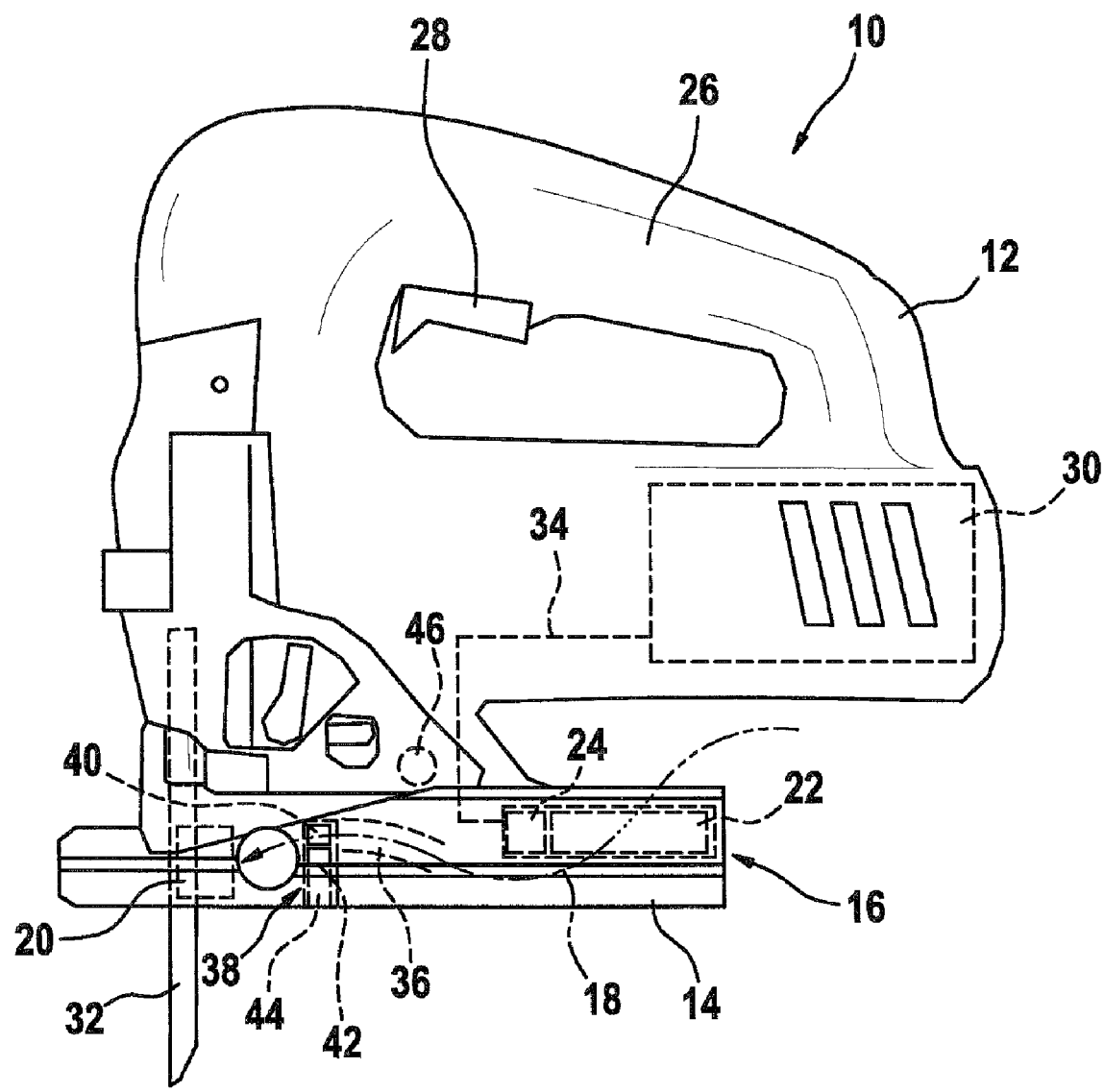
FIG. 1 shows a handheld power tool with a foot plate and with a pump unit located in the foot plate.

FIG. 1 shows a handheld power tool 10, embodied as a jigsaw, with a housing 12, a foot plate 14 for guiding the handheld power tool 10 on a surface of a workpiece (not shown here), and a pump unit 16 for driving a coolant and/or lubricant flow 18 for cooling and/or lubricating at least one heavy-duty component 20.

The pump unit 16 of the handheld power tool 10 has a turbine wheel 22 and includes a small electric motor 24, which together with the turbine wheel 22 is located inside the foot plate 14. Instead of the turbine wheel 22, some other kind of fan or ventilator could alternatively be used.

The housing 12 further includes a handle 26 for guiding the handheld power tool 10 and an ON/OFF switch 28 located in the vicinity of the handle 26.

The handheld power tool 10 includes a motor 30, separate from the pump unit 16, for driving a tool insert 32, specifically a saw blade. The pump unit 16 and the motor 30 have a common power supply 34, which is designed such that whenever the motor 30 is in operation, the pump unit 16 or in other words its electric motor 24 is necessarily in operation as well.

One of the heavy-duty components 20 of the handheld power tool 10 that are cooled and lubricated by the coolant and/or lubricant flow 18 is embodied as a saw blade guide unit. In operation, the saw blade guide unit guides the tool insert 32 embodied as a saw blade in a known manner so that it swings up and down.

The pump unit 16 is intended for generating an air flow, specifically in such a way that it aspirates air from outside, specifically from a top side of the foot plate, through a filter or grating and introduces it at high pressure into a cooling air line 36.

The cooling air line 36 carries the air flow through a means 38 for admixing lubricant droplets with the air flow. The means 38 includes a Venturi nozzle 40, shown here only schematically, as its central element.

The Venturi nozzle 40 is dimensioned such that per hour of operation, less than one gram of a lubricant 42 is admixed with the air flow, so that during a full day's operation of the handheld power tool 10, only about a thimbleful of the lubricant 42 is entrained by the flow of cooling air and is carried to the heavy-duty components 20 that are to be cooled, or to the tool insert 32. There, the lubricant 42 carried in the form of small droplets in the coolant and/or lubricant flow 18 are deposited onto the surface of the heavy-duty components 20 that are to be lubricated, or on the tool insert 32, and lead to minimal-quantity lubrication, which significantly lengthens the service life of the components 20 or the tool insert 32.

At the same time, the majority of the air in the coolant and/or lubricant flow 18 that comprises air and lubricant 42 assures cooling of the affected components 20 or the tool insert 32. As a result, wearing of the tool insert 32 in particular is reduced, and the service life of the entire handheld power tool 10, or of the affected components 20, is lengthened still further.

The lubricant 42 is delivered to the coolant and/or lubricant flow 18 via the Venturi nozzle 40 from a lubricant container 44 located inside the foot plate 14; in an exemplary embodiment not shown here, this container includes a refill opening for refilling the lubricant container 44 with lubricant 42.

In the exemplary embodiment shown in FIG. 1, the lubricant container 44 is connected detachably to the foot plate 14 and is furthermore embodied as a replaceable lubricant cartridge. The construction of the lubricant container, which includes a plastic sleeve and a closure ball, can be similar for instance to known ink cartridges for fountain pens.

In an alternative exemplary embodiment of the invention, an adjusting element 46 for adjusting at least one parameter of the coolant and/or lubricant flow 18, specifically an intensity of the minimal-quantity lubrication generated by the lubricant 42, is provided. The adjusting element 46 is shown here only schematically and may either be completely mechanical or actuate an actuator electronically.

By way of the adjusting element 46, in the alternative exemplary embodiment, a cross section of a constriction of the Venturi nozzle 40 can be varied. An underpressure, determined by the pressure in the constriction of the Venturi nozzle 40, at a mouth of the lubricant container 44 is thus varied. As a result of the change in the underpressure, the quantity of lubricant carried in the coolant and/or lubricant flow 18 changes as well.

The invention claimed is:

1. A handheld power tool, comprising:
a housing;
a foot plate for guidance on a surface of a workpiece;
a pump unit for driving a coolant and/or lubricant flow for cooling and/or lubricating at least one heavy-duty component; and
a lubricant container located inside the foot plate,
wherein the pump unit comprises a turbine wheel and an electric motor, wherein the pump unit is located in the foot plate, wherein the pump unit comprises a filter through which the pump unit introduces air with high pressure into a cooling air line of the pump unit, and wherein the lubricant container is connected to the cooling air line for delivering lubricant to the coolant and/or lubricant air flow.

2. A handheld power tool, comprising:
a housing;
a foot plate for guidance on a surface of a workpiece; and
a pump unit for driving a coolant and/or lubricant flow for cooling and/or lubricating at least one heavy-duty component,
wherein the pump unit comprises a turbine wheel and an electric motor, and wherein the pump unit is located in the foot plate.

3. The handheld power tool according to claim 2, wherein the pump unit is completely surrounded by the foot plate.

4. The handheld power tool according to claim 2, wherein the pump unit is located along a working direction behind the heavy-duty component.

5. The handheld power tool according to claim 2, wherein the pump unit comprises a filter through which the pump unit introduces air with high pressure into a cooling air line of the pump unit.

6. The handheld power tool according to claim 5, wherein the pump unit comprises a Venturi nozzle located in the cooling air line.

7. A handheld power tool, comprising:
a housing (12);
a foot plate (14) for guidance on a surface of a workpiece; and
a pump unit (16) for driving a coolant and/or lubricant flow (18) for cooling and/or lubricating at least one heavy-duty component (20), wherein the pump unit (16) is located in the foot plate (14).

8. The handheld power tool as defined by claim 7, further comprising a motor (30) for driving a tool insert (32), wherein said motor (30) is spaced from the pump unit (16).

9. The handheld power tool as defined by claim 8, wherein the pump unit (16) and the motor (30) have a common power supply (34).

10. The handheld power tool as defined by claim 7, wherein the at least one heavy-duty component (20) is embodied as a saw blade guide unit for guiding a tool insert (32) embodied as a saw blade.

11. The handheld power tool as defined by claim 7, wherein the at least one heavy-duty component (20) is embodied as a tool insert (32).

12. The handheld power tool as defined by claim 7, wherein the pump unit (16) generates an air flow.

13. The handheld power tool as defined by claim 12, further comprising a means (38) for admixing lubricant droplets with the air flow.

14. The handheld power tool as defined by claim 13, wherein the means (38) includes a Venturi nozzle (40).

15. The handheld power tool as defined by claim 14, wherein the Venturi nozzle (40) is dimensioned such that less than one gram of a lubricant (42) per hour of operation is admixed with the air flow.

16. The handheld power tool as defined by claim 7, further comprising a lubricant container (44) located inside the foot plate (14).

17. The handheld power tool as defined by claim 16, wherein the lubricant container (44) is detachably connected to the foot plate (14).

18. The handheld power tool as defined by claim 17, wherein the lubricant container (44) is embodied as a replaceable lubricant cartridge.

19. The handheld power tool as defined by claim 7, further comprising an adjusting element (46) for adjusting at least one parameter of the coolant and/or lubricant flow (18).

* * * * *